United States Patent
Chan et al.

(10) Patent No.: US 11,378,794 B2
(45) Date of Patent: Jul. 5, 2022

(54) SUPPORT FACILITY FOR A BINOCULAR

(71) Applicant: Really Right Stuff, LLC, Lehi, UT (US)

(72) Inventors: Verent Joseph Chan, Lehi, UT (US); Joseph M. Johnson, Sr., Draper, UT (US)

(73) Assignee: REALLY RIGHT STUFF, LLC, Lehi, UT (US)

( * ) Notice: Subject to any disclaimer, the term of this patent is extended or adjusted under 35 U.S.C. 154(b) by 92 days.

(21) Appl. No.: 16/880,943

(22) Filed: May 21, 2020

(65) Prior Publication Data
US 2021/0364777 A1 Nov. 25, 2021

(51) Int. Cl.
*F16M 13/02* (2006.01)
*F16M 11/02* (2006.01)
*G02B 23/18* (2006.01)
*G02B 23/16* (2006.01)
*F16M 11/04* (2006.01)
*G02B 23/14* (2006.01)
*F41G 1/30* (2006.01)
(Continued)

(52) U.S. Cl.
CPC .......... *G02B 23/18* (2013.01); *F16M 11/041* (2013.01); *F16M 13/02* (2013.01); *F16M 11/16* (2013.01); *F41G 1/30* (2013.01); *G02B 23/14* (2013.01); *G02B 27/36* (2013.01)

(58) Field of Classification Search
CPC ...... G02B 23/18; G02B 27/36; F16M 11/041; F16M 13/02; F16M 11/16; F41G 1/30
See application file for complete search history.

(56) References Cited

U.S. PATENT DOCUMENTS 1,515,412 A * 11/1924 Ritter ..................... A44B 11/18
24/197
4,777,703 A * 10/1988 Knox ..................... A44B 11/125
24/170
(Continued)

OTHER PUBLICATIONS

Opticsplanet, Inc., "Leupold Binocular Tripod Adapter Tray 172625 Color: Black, 29% Off," https://www.opticsplanet.com/leupold-binocular-tripod-adapter-tray.html, (c) 1999-2020, Accessed Feb. 26, 2020.
(Continued)

*Primary Examiner* — Tan Le
(74) *Attorney, Agent, or Firm* — Bennet K. Langlotz; Langlotz Patent & Trademark Works, LLC

(57) ABSTRACT

A support facility for a binocular has a base, the base including a tripod connection facility, a flexible strap having a first strap end connected to the base, and an opposed second strap end, a tensioner connected to the base and to the second strap end, the flexible strap, the base, and the tensioner defining an opening configured to receive a first barrel of the binocular, and the flexible strap including a length adjustment facility adjustable over a range of length adjustment positions. The length adjustment facility may be configured to provide a selected strap length based on the diameter of the first barrel. The tensioner may be configured to operate between a released position in which the length adjustment facility is removable from or movable along the flexible strap and an engaged position in which the support facility is engaged to the first barrel.

18 Claims, 10 Drawing Sheets

(51) Int. Cl.
　　　*G02B 27/36*　　　(2006.01)
　　　*F16M 11/16*　　　(2006.01)

(56) References Cited

U.S. PATENT DOCUMENTS

| | | | | |
|---|---|---|---|---|
| 5,938,155 | A * | 8/1999 | Garland | F16M 13/00 |
| | | | | 248/187.1 |
| 8,132,764 | B2 * | 3/2012 | Kuipers | F16M 11/041 |
| | | | | 248/230.8 |
| 10,070,702 | B2 * | 9/2018 | Daniel | A44B 13/02 |
| 2011/0310476 | A1 * | 12/2011 | Russ | F41G 1/38 |
| | | | | 359/412 |
| 2018/0020130 | A1 * | 1/2018 | Harden | H04N 5/2251 |

OTHER PUBLICATIONS

Outdoorsmans, "Bino Hand," https://outdoorsmans.com/collections/all/products/bino-hand, Accessed Feb. 26, 2020.
Sportsman's Warehouse, "Vortex Universal Binocular Tripod Adapter," https://www.sportsmans.com/hunting-gear-supplies/optics-binoculars-scopes-rangefinders/tripods-mounts-accessories/vortex-universal-binocular-tripod-adapter/p/1251978?channel=shopping&gclid=CjwKCAjwnlr1BRAWEiwA6GpwNX1yn_n483kbebqU-g7kBMYcguCBc550587CZeDICHX3CKMM-UHqBoCzjoQAvD_BwE, (c) 2020, Accessed Apr. 27, 2020.

* cited by examiner

SUPPORT FACILITY FOR A BINOCULAR

FIELD OF THE INVENTION

The present invention relates to binoculars, and more particularly to a support facility for a binocular that enables both open bridge and closed bridge styles of binoculars to be mounted on a tripod.

BACKGROUND OF THE INVENTION

Support facilities for a binocular provide many advantages to the user when they are installed on a binocular. Mounting a binocular on a tripod stabilizes the view through the binocular, eliminates arm strain from holding the binocular, and makes extended viewing periods comfortable.

Although various prior art binocular tripod adapters exist, they lack the ability to retain the fit adjustment of the binocular tripod adapter to fit a specific binocular. Thus, the user must readjust the fit of the binocular tripod adapter each time the binocular tripod adapter is removed and replaced on the binocular. In addition, many existing solutions do not offer the flexibility to adapt to a wide variety of sizes of ocular bodies. Furthermore, there are post-style tripod adapters for a binocular, but they have many problems including loosening over time, loose parts that can get lost in the field, and they add unneeded height that prevents fitting the binocular in a carry case easily.

Therefore, a need exists for a new and improved support facility for a binocular that enables both open bridge and closed bridge styles of binoculars to be mounted on a tripod. In this regard, the various embodiments of the present invention substantially fulfill at least some of these needs. In this respect, the support facility for a binocular according to the present invention substantially departs from the conventional concepts and designs of the prior art, and in doing so provides an apparatus primarily developed for the purpose of enabling both open bridge and closed bridge styles of binoculars to be mounted on a tripod.

SUMMARY OF THE INVENTION

The present invention provides an improved support facility for a binocular, and overcomes the above-mentioned disadvantages and drawbacks of the prior art. As such, the general purpose of the present invention, which will be described subsequently in greater detail, is to provide an improved support facility for a binocular that has all the advantages of the prior art mentioned above.

To attain this, the preferred embodiment of the present invention essentially comprises a base, the base including a tripod connection facility, a flexible strap having a first strap end connected to the base, and an opposed second strap end, a tensioner connected to the base and to the second strap end, the flexible strap, the base, and the tensioner defining an opening configured to receive a first barrel of the binocular, and the flexible strap including a length adjustment facility adjustable over a range of length adjustment positions. The length adjustment facility may be configured to provide a selected strap length based on the diameter of the first barrel. The tensioner may be configured to operate between a released position in which the length adjustment facility is removable from or movable along the flexible strap and an engaged position in which the support facility is engaged to the first barrel. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
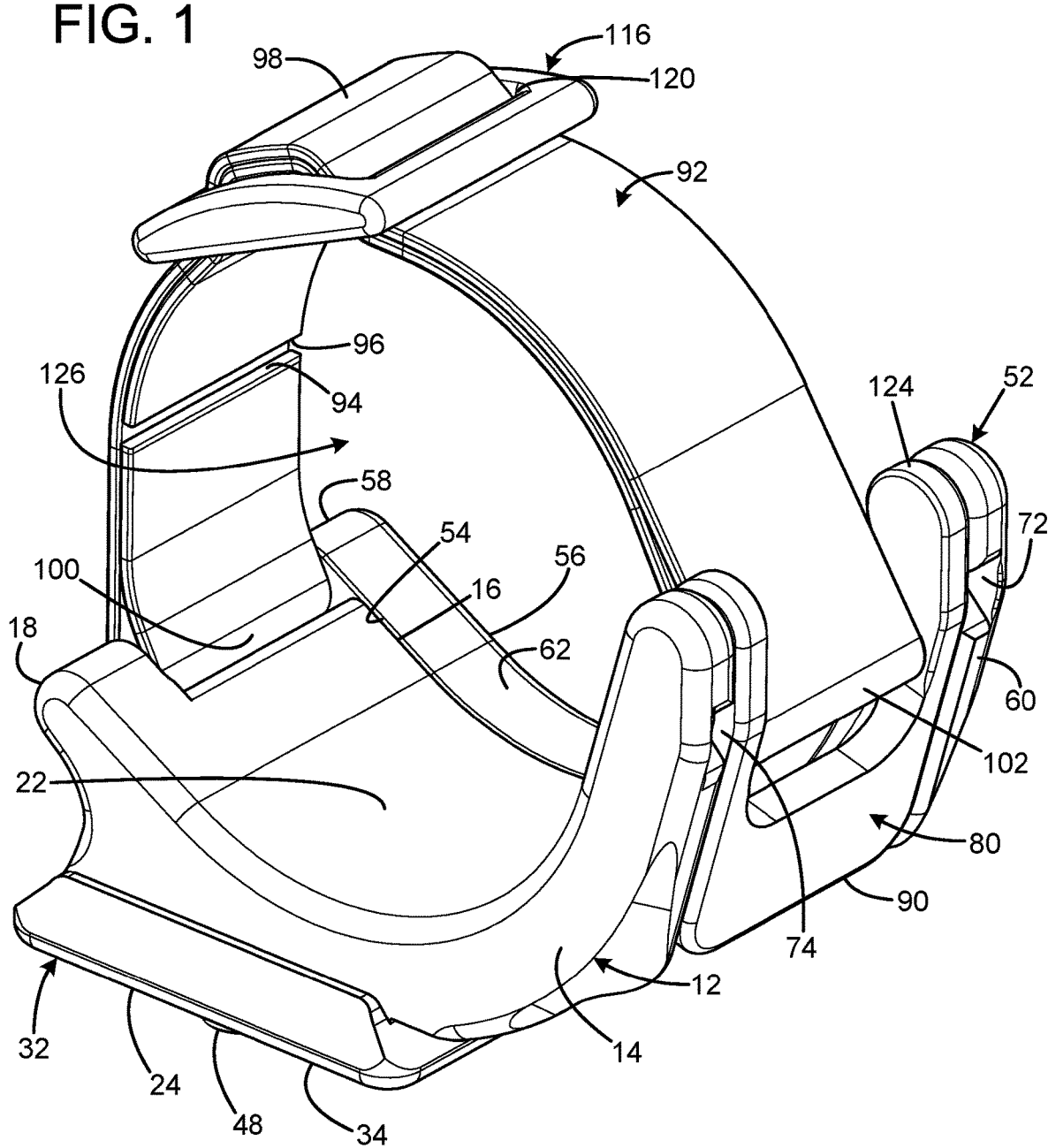
FIG. 1 is a front isometric view of the current embodiment of a support facility for a binocular constructed in accordance with the principles of the present invention.

An embodiment of the support facility for a binocular of the present invention is shown and generally designated by the reference numeral 10.

Figure 2:
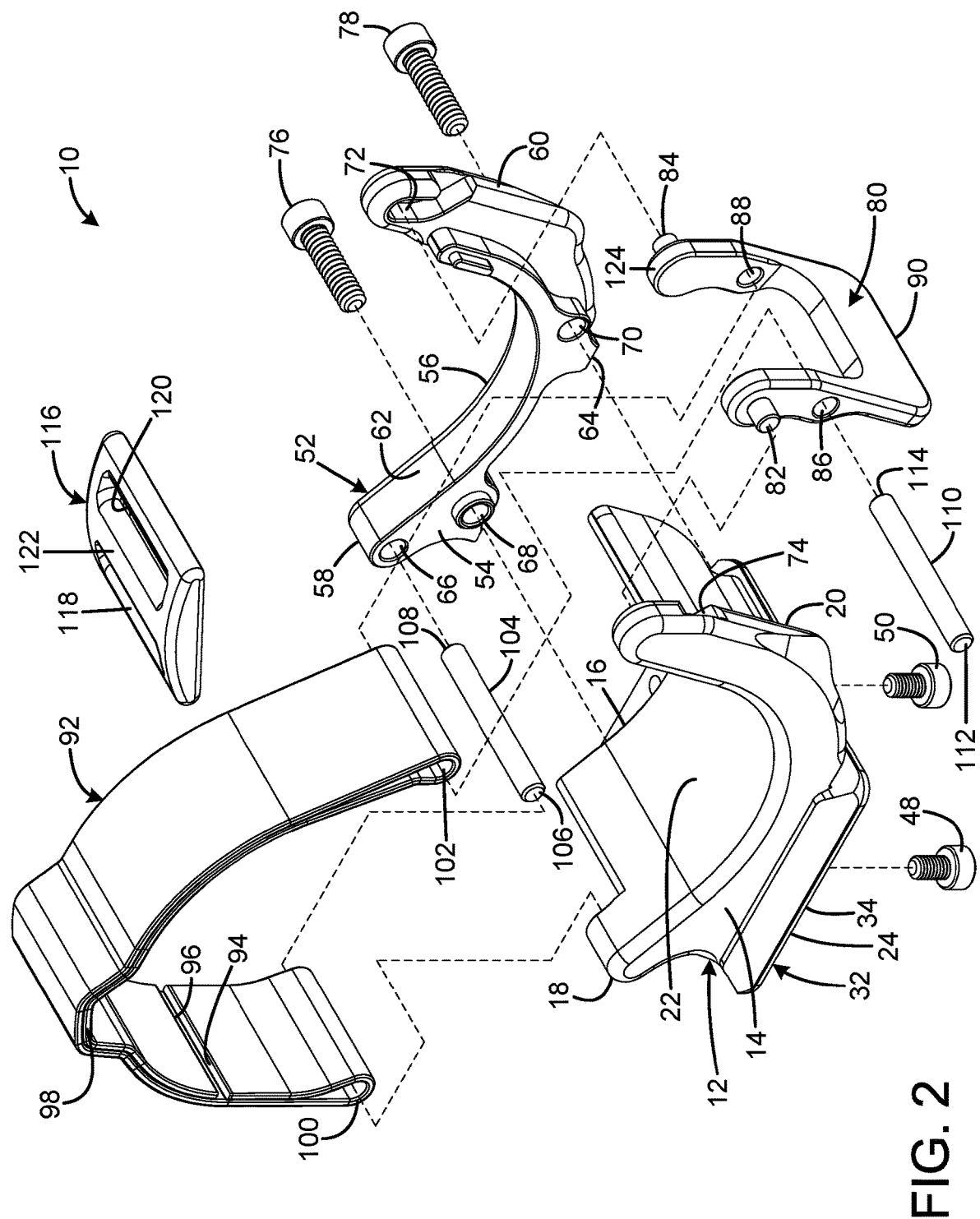
FIG. 2 is an exploded view of the support facility for a binocular of FIG. 1.
Figure 3:
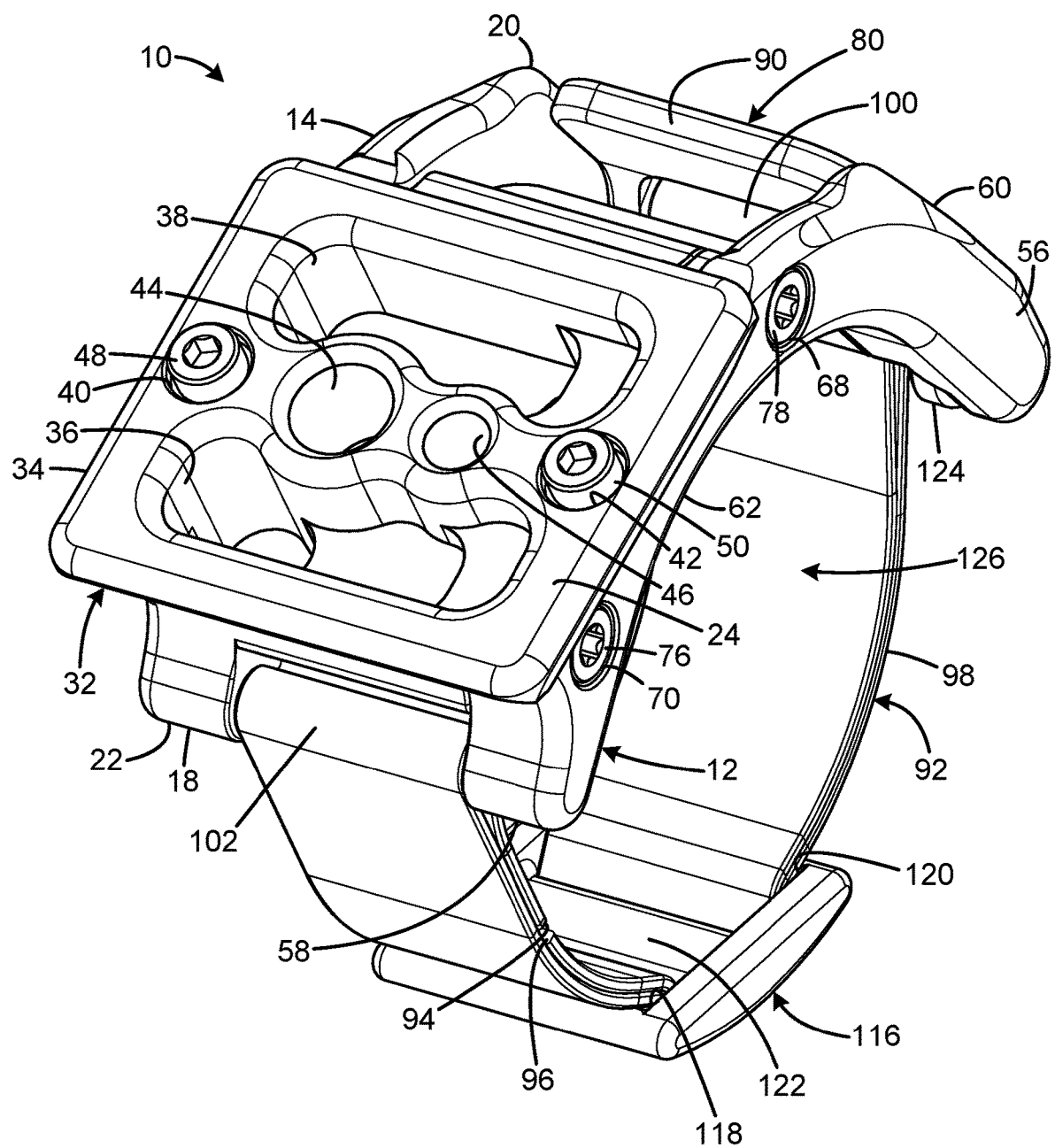
FIG. 3 is a bottom isometric view of the support facility for a binocular of FIG. 1.

FIGS. 1-3 illustrate the improved support facility for a binocular 10 of the present invention. More particularly, FIGS. 1 & 3 show the support facility for a binocular with the tensioning quick release lever 80 in the engaged position. The support facility for a binocular has a base 12 having a front 14, rear 16, right side 18, left side 20, top 22, and bottom 24. The top of the base is concave in shape and defines three rearward-facing apertures 26, 28, 30 (visible in FIGS. 6-8) and a rearward-facing front slot 74. The bottom of the base includes a tripod connection facility 32 having a dovetail 34 configured to be received by a standard tripod mount clamp and defining a right cavity 36, left cavity 38, front aperture 40, rear aperture 42, threaded aperture 44, and smooth aperture 46. The right and left cavities decrease the weight of the support facility for a binocular. The front and rear apertures receive a front safety stop screw 48 and a rear safety stop screw 50, respectively, to prevent the support facility for a binocular from sliding off a standard tripod mount clamp during installation thereto. The threaded aperture has a ¼-20 thread to be compatible with a standard tripod mount screw (not shown). The smooth aperture is sized to be compatible with a standard tripod mount spring-loaded pin (not shown). In alternative embodiments, the front and rear safety stop screws can be omitted, and the ¼-20 threaded aperture can also be omitted so there is only a single ⅜-16 threaded mounting aperture. A thread reducer bushing can be used to convert the ⅜-16 threaded mounting aperture from a ⅜-16 thread to a ¼-20 thread.

A rear bar 52 is attached to the rear 16 of the base 12. The rear bar has a front 54, rear 56, right side 58, left side 60, top 62, and bottom 64. The top of the rear bar is concave in shape and defines three forward-facing apertures 66, 68, 70 and a forward-facing rear slot 72. Apertures 68, 70 of the rear bar are axially registered with apertures 28, 30 of the base such that right screw 76 and left screw 78 are received within the apertures to threadedly secure the rear bar to the rear of the base. When the rear bar is attached to the base, the rear slot is axially registered with the front slot 74 in the base.

A tensioning quick release lever/tensioner/tensioning facility 80 is pivotally connected to the left sides 20, 60 of the base 12 and rear bar 52 by front and rear protrusions 82, 84 at the top 124 that are releasably received by the rear slot 72 in the rear bar and the front slot 74 in the base. The tensioning quick release lever defines a front aperture 86 and a rear aperture 88 below the front and rear protrusions, respectively, and has a bottom 90. The tensioning quick release lever is an over-center clamp mechanism in the current embodiment and is a tensioning element other than a length adjusting element.

A flexible strap 92 has opposing ends 94, 96 (a first strap end and an opposed second strap end). The opposing ends of the strap overlap an intermediate portion 98 of the strap to form a right loop 100 and a left loop 102. In the current embodiment, end 94 is sewn with bar tacks to secure end 94 to the intermediate portion of the strap. The right loop is pivotally secured to the right sides 18, 58 of the base 12 and rear bar 52 by a right pin 104 having opposing ends 106, 108 that are received in apertures 26, 66 in the base and rear bar. The right loop encompasses the right pin, which serves as a strap support bar. The left loop is pivotally secured to the tensioning lever 80 by a left pin 110 having opposing ends 112, 114 that are received by the front aperture 86 and rear aperture 88 in the tensioning quick release lever. The left loop encompasses the left pin, which serves as a strap support bar. A tri-bar glide/adjustor 116 having a left aperture 118 and a right aperture 120 separated by a central bar 122 receives the middle portion of the strap and the overlapping portion of opposing end 96 of the strap. The two overlapping layers of strap pass upwards through the right aperture, pass over the central bar, and pass downwards through the left aperture. The tri-bar glide is a length adjustment facility positioned at an intermediate position on the strap away from the opposing and 94 of the strap. The length adjustment facility is adjustable over a range of length adjustment positions to create an effective length of the strap. The length adjustment facility is configured to provide a continuous range of length positions and is infinitely adjustable within the range of length positions. Although end 96 is free, end 96 is trapped by the effect of the tri-bar glide, as well as being captured by the tension of the outer layer of the strap. In the current embodiment, the strap is a woven web, and the opposing end/second strap end 96 is connected to the tensioning quick release lever such that the strap does not protrude beyond the tensioning quick release lever. The strap, base, rear bar, and the tensioning quick release lever define an opening 126. It should be appreciated that tension on the strap retains the tensioning quick release lever in the engaged position because the tension in the strap applies a force that pulls the tensioning quick release lever shut.

Figure 4:
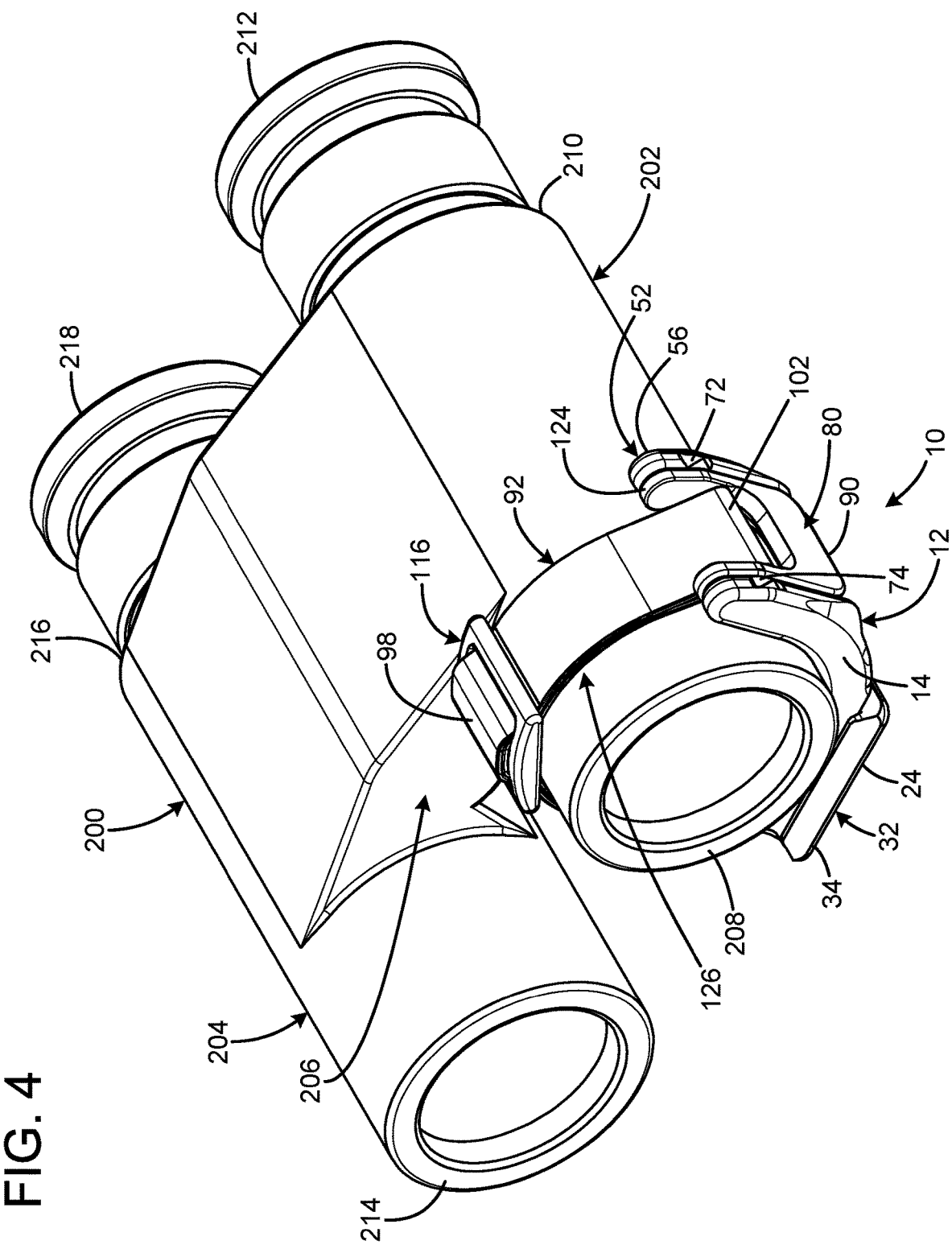
FIG. 4 is a front isometric view of the support facility for a binocular of FIG. 1 attached to a barrel of a closed bridge style binocular with the tensioning quick release lever in the engaged position.
Figure 5:
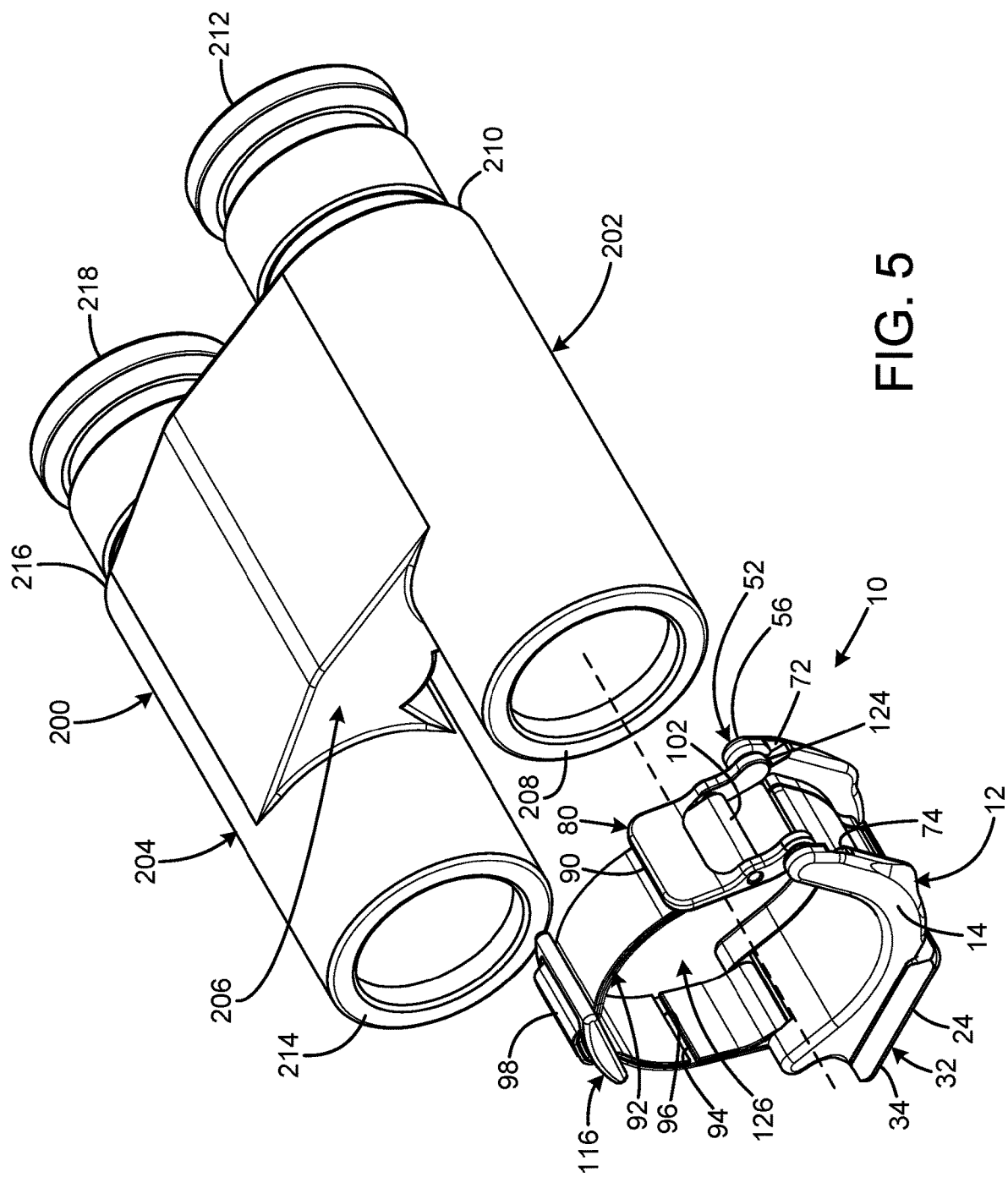
FIG. 5 is a front isometric view of the support facility for a binocular of FIG. 1 removed from a barrel of a closed bridge style binocular with the tensioning quick release lever in the released position.

FIGS. 4 & 5 illustrate the improved support facility for a binocular 10 of the present invention. More particularly, in FIG. 4 the support facility for a binocular is shown attached to a left barrel 202 of a closed bridge style binocular 200 having a pair of connected barrels (left barrel 202 and right barrel 204) with the tensioning quick release lever 80 in the engaged position. In FIG. 5, the support facility for a binocular is shown removed from the left barrel of the closed bridge style binocular with the tensioning quick release lever in the released position. The opening 126 defined by the strap 92, base 12, rear bar 52, and the tensioning quick release lever is configured to receive either the left barrel 202 or the right barrel 204 of the closed bridge style binocular 200. The left barrel and right barrel are spaced-apart and connected by a closed bridge 206. The left barrel has a front 208 and a rear 210 with a rear eyepiece 212. The right barrel has a front 214 and a rear 216 with a rear eyepiece 218.

To attach the support facility for a binocular 10 to the closed bridge style binocular 200, the user slides the tri-bar glide 116 to a position to provide a selected strap length of the strap 92 based on the diameter of the left or right barrel 202, 204. With the tensioning quick release lever 80 in the released position/released condition, the user inserts the front 208, 214, of either the left or right barrel through the opening 126 of the support facility for a binocular until the tri-bar glide abuts the closed bridge 206. Then, the user pushes downward on the bottom 90 of the tensioning quick release lever to tension the strap about the selected barrel and clamp the front of the left or right barrel between the strap and the tops 22, 62 of the base and rear bar 52. The user then inserts the dovetail 34 of the base 12 into a standard tripod mount clamp (not shown), engages a standard tripod mount spring-loaded pin (not shown) with the smooth aperture 46 in the bottom 24 of the base, and threadedly engages a standard tripod mount screw with the threaded aperture 44 and the bottom of the base to secure the closed bridge style binocular to a tripod/support. The barrel that is not encompassed by the support facility for a binocular (the second barrel) is supported only by connection to the encompassed barrel (the first barrel). Tensioning the strap prevents rotation of the first barrel with respect to the strap in response to a torque applied by the weight of the second barrel. Furthermore, the second barrel remains free of contact by the base and strap despite being supported by connection to the first barrel. Because the tensioning quick release lever is releasably received by the rear slot 72 in the rear bar 52 and the front slot 74 in the base 12, the tensioning quick release lever makes the support facility for a binocular easy to install because unthreading the strap from the tensioning quick release lever and threading it back together are not required for installation. Alternatively, a hook could be added to the strap to enable the strap to be removed and installed from pin 104 or pin 110 easily instead of or in addition to the releasably received tensioning quick release lever. It should also be appreciated that the tensioning quick release lever could be placed at pin 104 instead of pin 110.

Figure 6:
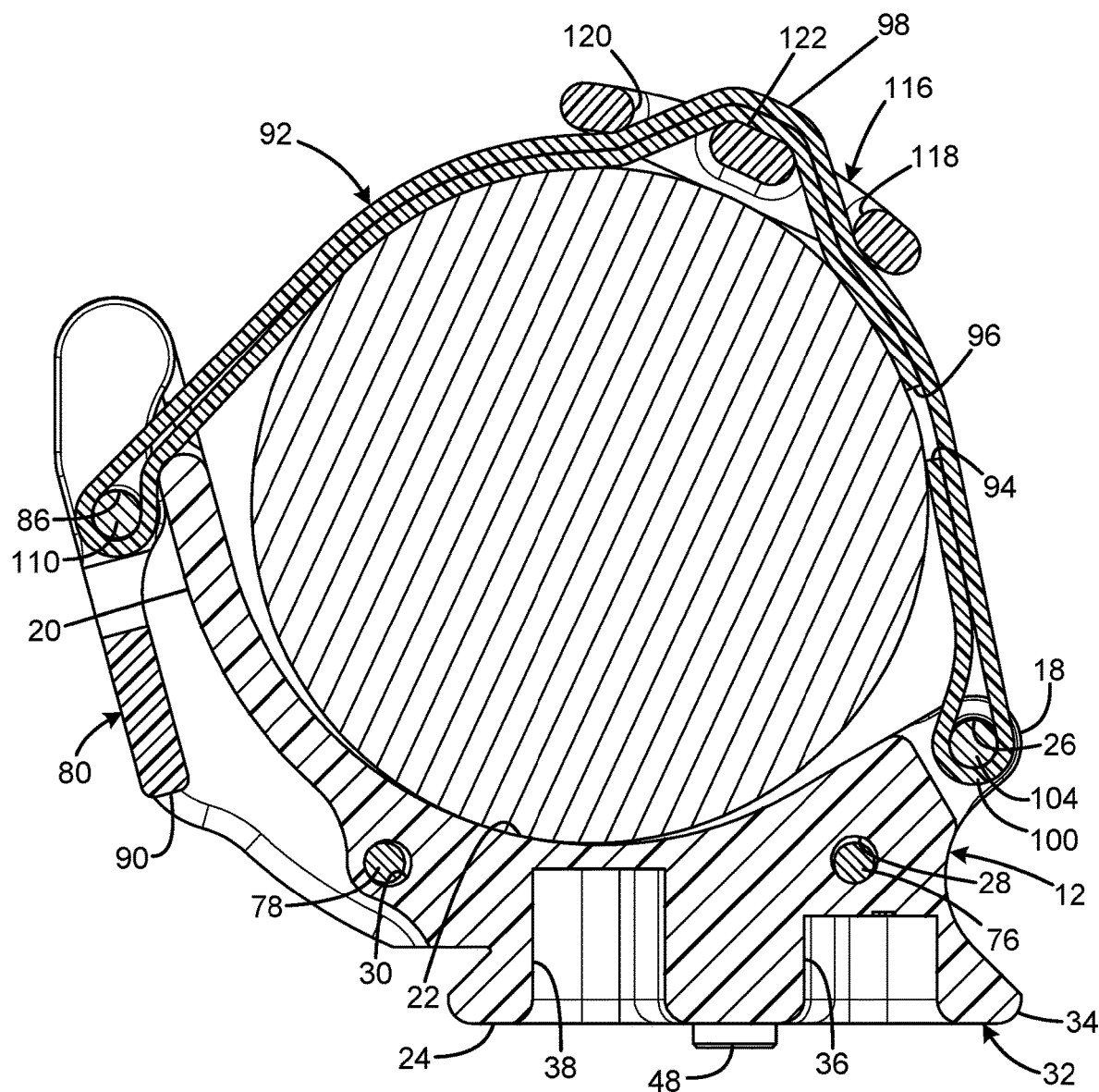
FIG. 6 is a side sectional view of the support facility for a binocular of FIG. 1 attached to a barrel of a closed bridge style binocular having a diameter of 1.77 inch/45 mm with the tensioning quick release lever in the engaged position.
Figure 7:
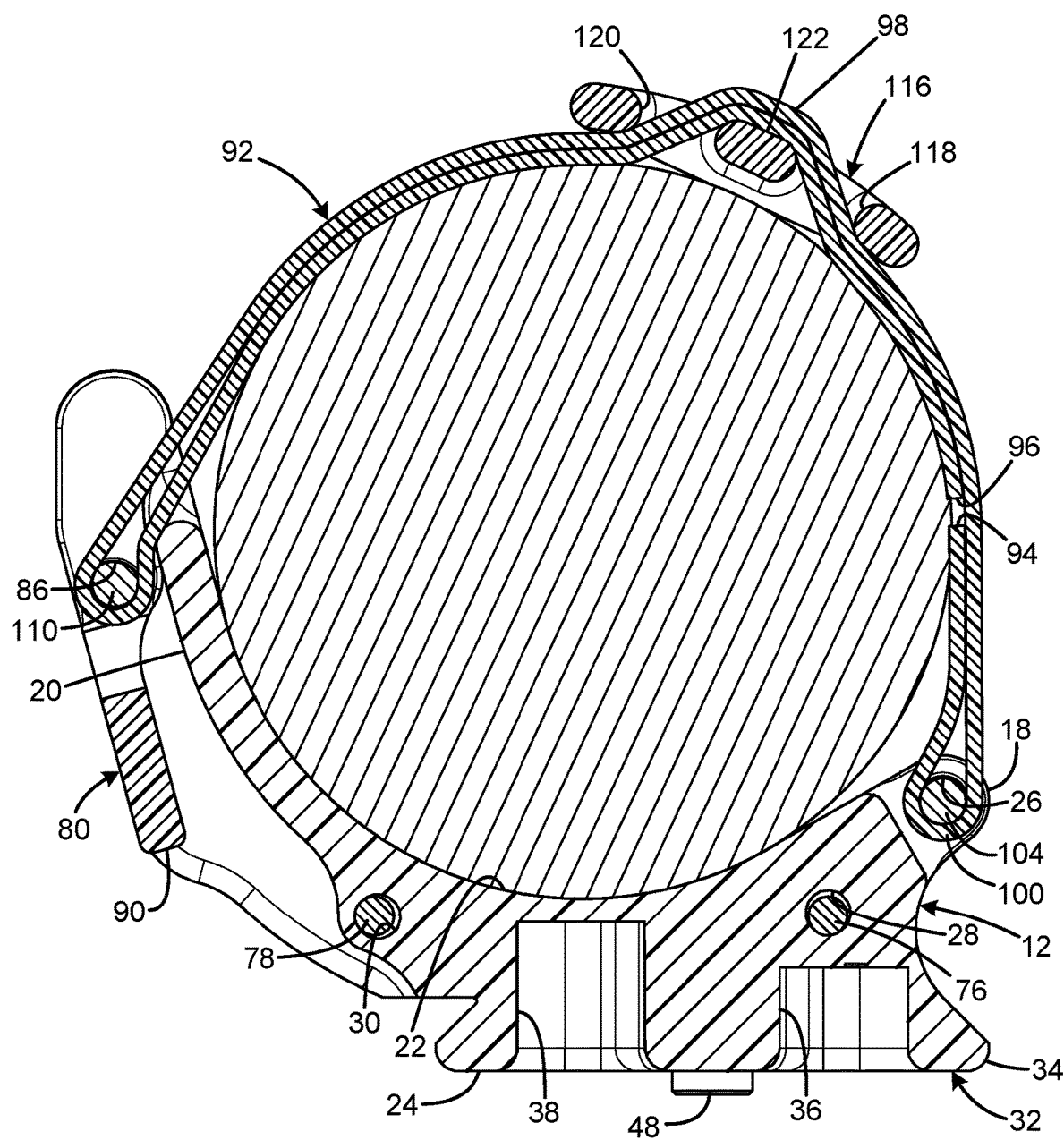
FIG. 7 is a rear sectional view of the support facility for a binocular of FIG. 1 attached to a barrel of a closed bridge style binocular having a diameter of 2 inch/51 mm with the tensioning quick release lever in the engaged position.
Figure 8:
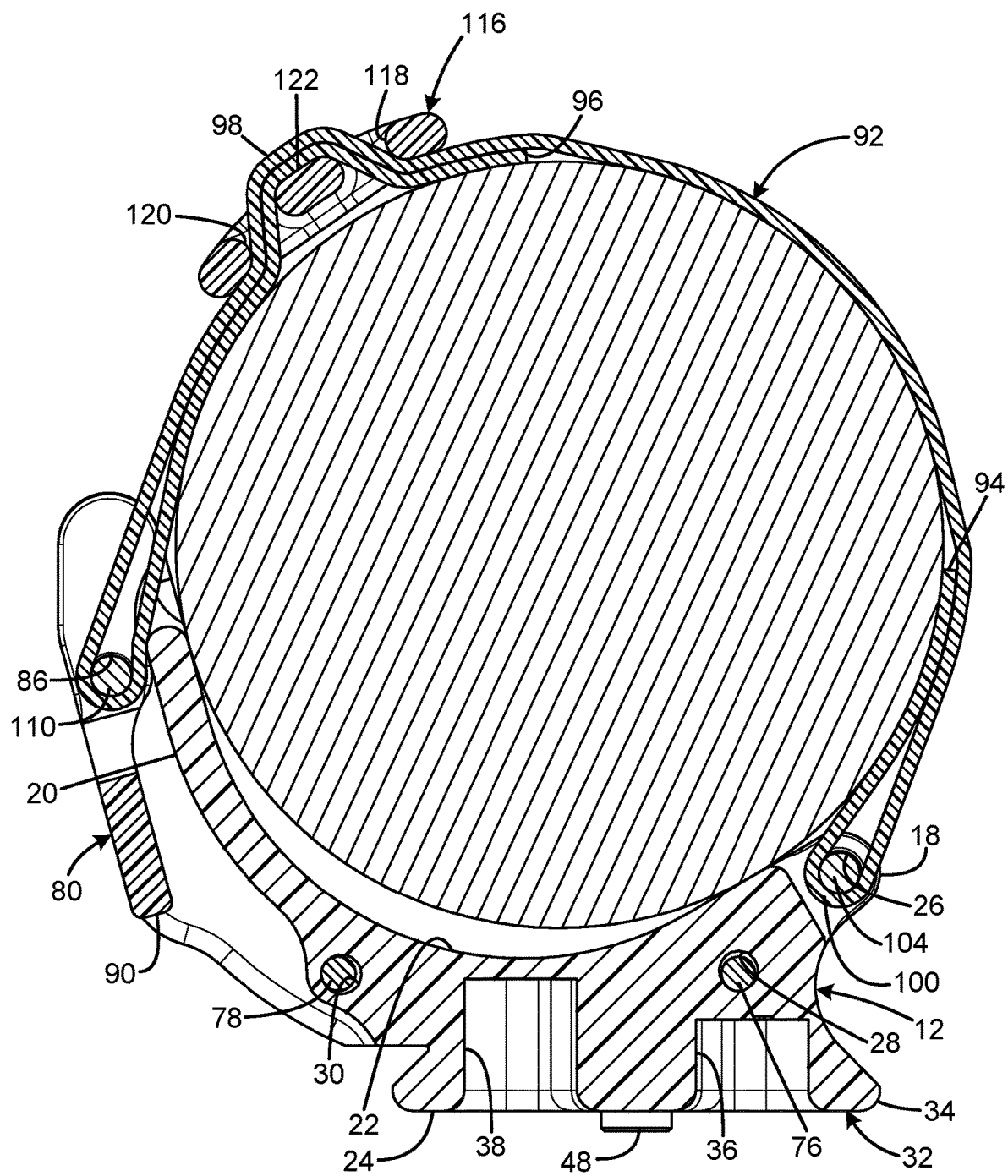
FIG. 8 is a rear sectional view of the support facility for a binocular of FIG. 1 attached to a barrel of a closed bridge style binocular having a diameter of 2.36 inch/60 mm with the tensioning quick release lever in the engaged position.

FIGS. 6-8 illustrate the improved support facility for a binocular 10 of the present invention. More particularly, FIGS. 6-8 show the position of the tri-bar glide 116 to provide a selected strap length of the strap 92 based on the diameter of the left or right barrel 202, 204 of the closed bridge style binocular 200. In FIG. 6, the barrel diameter is 1.77 inch/45 mm, which is the smallest barrel diameter the support facility for a binocular can accommodate. In FIG. 7, the barrel diameter is 2 inch/51 mm, which is the barrel diameter that most closely matches the curvature of the convex tops 22, 62 of the base 12 and rear bar 52. In FIG. 8, the barrel diameter is 2.36 inch/60 mm, which is the largest barrel diameter the support facility for a binocular can accommodate.

The top 22 of the base 12 can be regarded as a cradle surface having a concavely curved central portion and having a first elongated base portion extending from a first end of the central portion and an opposed second elongated base portion extending from an opposed second end of the central portion, with the first strap end 94 of the strap 92 connected to the first base end and the second strap end 96 of the strap connected to the second base end. The base can also be viewed as a V block configured to supportably receive a range of barrel diameters. In the specification, the term V block is defined as anything that receives different diameters at different distances from the vertex and supports along two points or lines of contact. The surfaces need not be straight, but can be concave (or even convex) with a radius greater than the supported cylinder so that two point/lines of contact are maintained. The base has opposed wing elements (right and left sides 18, 20) connected by a central radiused portion. The central radius portion has a radius of at most 25.4 mm such that a barrel of that radius or greater is supported in at least two locations on the cradle surface. However, if the barrel has a radius smaller than 25.4 mm, the cradle can still adequately retain the barrel if the barrel has a rubberized coating that enables a firm hold. The cradle surface has an effective maximum diameter capacity defined by a circle having a center defined by the intersection of perpendicular lines at the ends of the wing elements. The maximum barrel diameter capacity is 69.4 mm, but accommodating that barrel diameter would require a longer strap that could potentially not fit barrels as small as 25.4 mm. In the current embodiment, the strap accommodates a barrel diameter from as small as 25.4 mm to as large as 62 mm, depending on the location of the bar tacks and interference between the bar tacks and the tri-bar glide 116.

Figure 9:
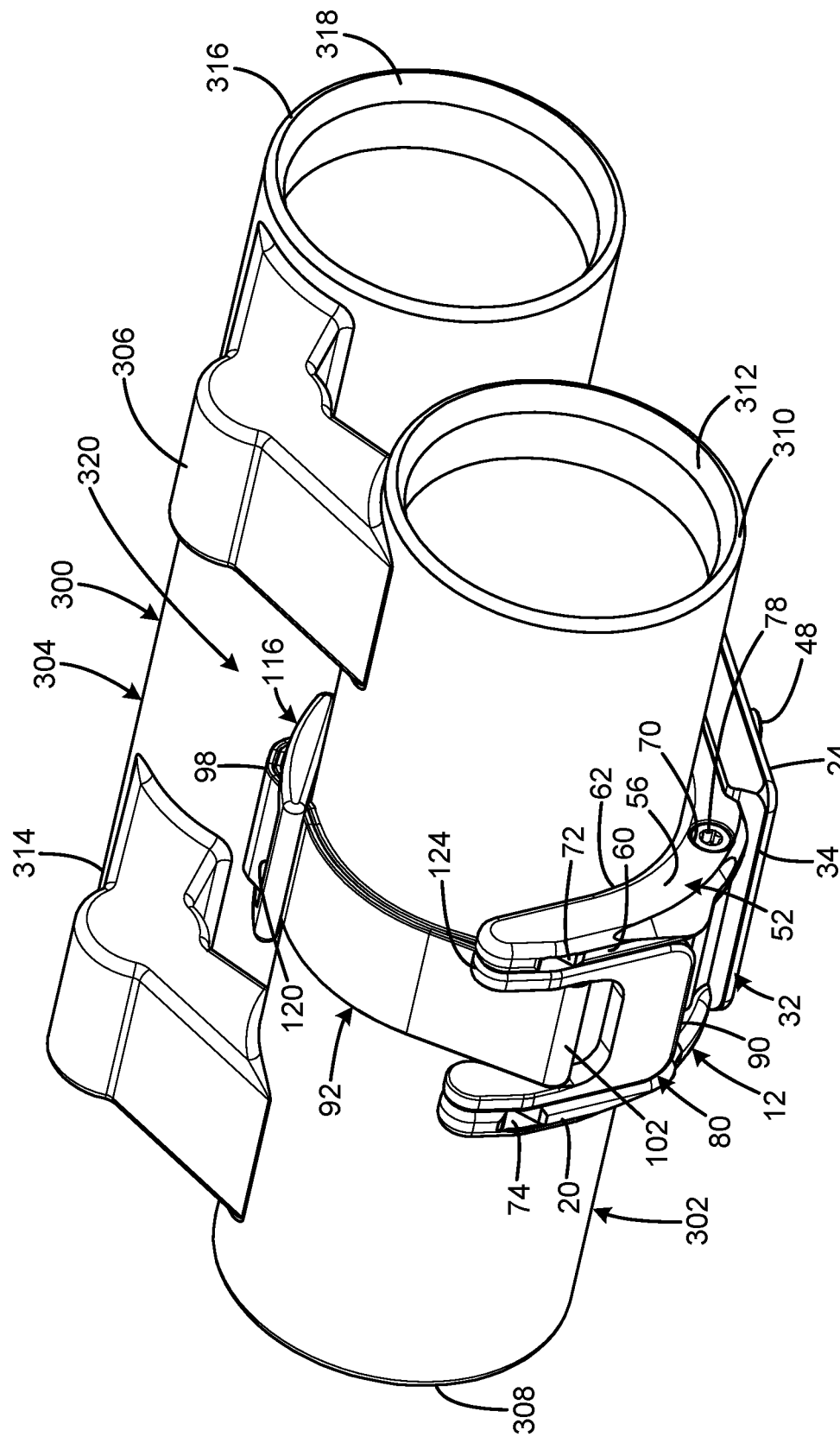
FIG. 9 is a rear isometric view of the support facility for a binocular of FIG. 1 attached to a barrel of an open bridge style binocular with the tensioning quick release lever in the engaged position.
Figure 10:
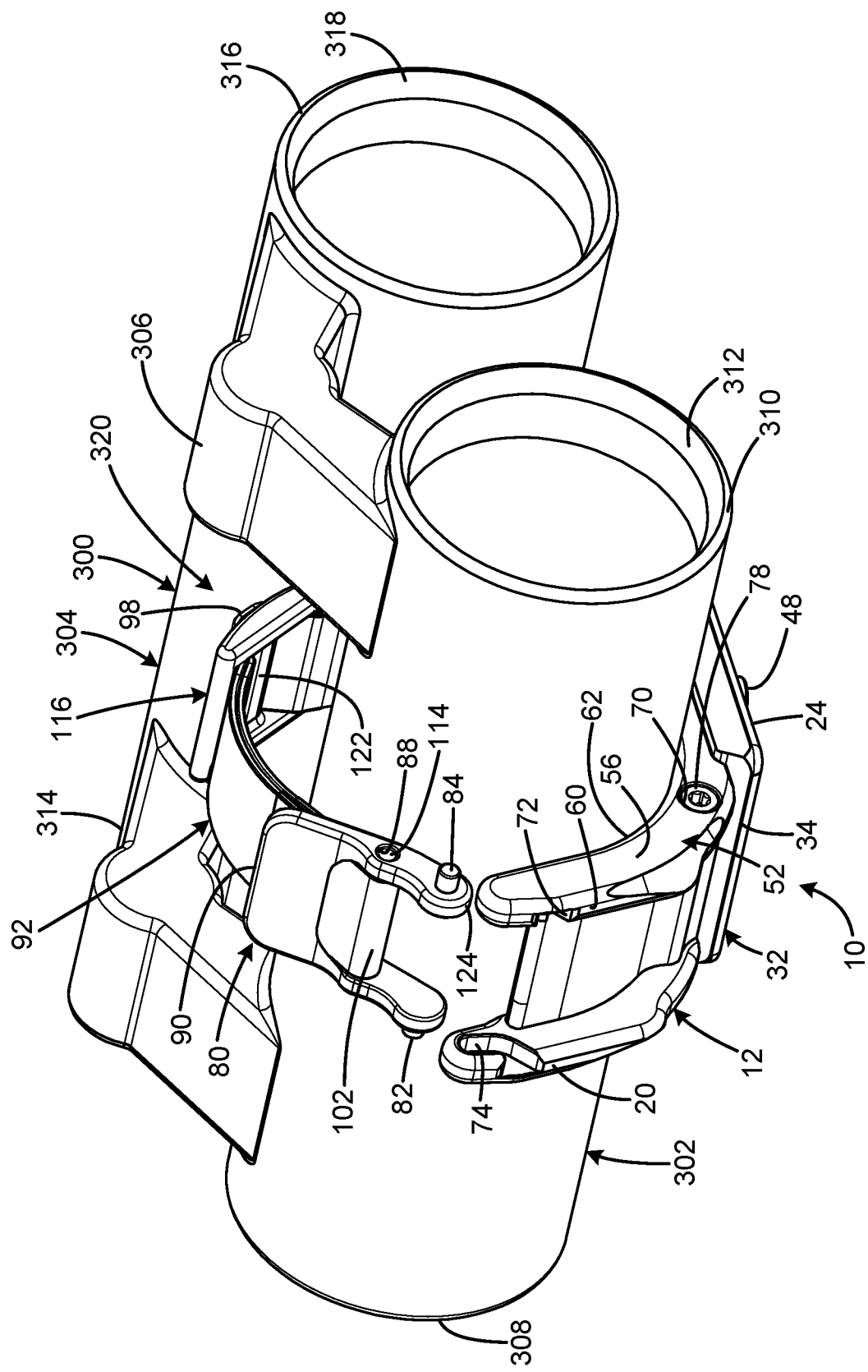
FIG. 10 is a rear isometric view of the support facility for a binocular of FIG. 1 in the process of being removed from a barrel of an open bridge style binocular with the tensioning quick release lever in the released position.

FIGS. 9 & 10 illustrate the improved support facility for a binocular 10 of the present invention. More particularly, in FIG. 9 the support facility for a binocular is shown attached to a left barrel 302 of an open bridge style binocular 300 with the tensioning quick release lever 80 in the engaged position. In FIG. 10, the support facility for a binocular is shown removed from the left barrel of the open bridge style binocular with the tensioning quick release lever in the released position. The opening 126 defined by the strap 92, base 12, rear bar 52, and the tensioning quick release lever is configured to receive either the left barrel 302 or the right barrel 304 of the open bridge style binocular 300. The left barrel and right barrel are connected by an open bridge 306. The left barrel has a front 308 and a rear 310 forming a rear eyepiece 312. The right barrel has a front 314 and a rear 316 forming a rear eyepiece 318.

To attach the support facility for a binocular 10 to the open bridge style binocular 300, the user slides the tri-bar glide 116 to a position to provide a selected strap length of the strap 92 based on the diameter of the left or right barrel 302, 304. With the tensioning quick release lever 80 in the released position, and with the front and rear protrusions 82, 84 withdrawn from the rear and front slots 72, 74 as shown in FIG. 10, the user passes the tensioning quick release lever through the central opening 320 in the open bridge 306 so the left or right barrel is received within the opening 126 of the support facility for a binocular and the tensioning quick release lever is outside the central opening in the open bridge. The user then inserts the front and rear protrusions into the rear and front slots. Subsequently, the user pushes downward on the bottom 90 of the tensioning quick release lever to tension the strap about the selected barrel to clamp the left or right barrel between the strap and the tops 22, 62 of the base and rear bar 52. The user then inserts the dovetail 34 of the base 12 into a standard tripod mount clamp (not shown), engages a standard tripod mount spring-loaded pin (not shown) with the smooth aperture 46 in the bottom 24 of the base, and threadedly engages a standard tripod mount screw with the threaded aperture 44 and the bottom of the base to secure the closed bridge style binocular to a tripod/support. The barrel that is not encompassed by the support facility for a binocular (the second barrel) is supported only by connection to the encompassed barrel (the first barrel). Tensioning the strap prevents rotation of the first barrel with respect to the strap in response to a torque applied by the weight of the second barrel. Furthermore, the second barrel remains free of contact by the base and strap despite being supported by connection to the first barrel. It should be appreciated that the support facility for a binocular accommodates the same range of barrel diameters for an open bridge style binocular as for a closed bridge style binocular.

While a current embodiment of a support facility for a binocular has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A support facility for a binocular having a pair of connected barrels, the support facility comprising:

a base;

the base including a tripod connection facility;

a flexible strap having a first strap end connected to the base, and an opposed second strap end;

a tensioner connected to the base and to the second strap end;

the flexible strap, the base, and the tensioner defining an opening configured to receive a first barrel of the binocular;

the flexible strap including a length adjustment facility adjustable over a range of length adjustment positions;

the base having a free end with opposed sidewalls defining a protected space;

the tensioner movable between a released position to enable removal of the binocular, and a secured position immobilizing the binocular; and the tensioner being received in the protected space when in the secured position.

2. The support facility for a binocular of claim 1 wherein the length adjustment facility is configured to provide a selected strap length based on a diameter of the first barrel of the binocular.

3. The support facility for a binocular of claim 1 wherein the tensioner is configured to operate between a released position in which the length adjustment facility is removable from or movable along the flexible strap and an engaged position in which the support facility is engaged to the first barrel.

4. The support facility for a binocular of claim 1 wherein the length adjustment facility is a tri-bar glide, and the tensioner is a quick release lever.

5. The support facility for a binocular of claim 1 wherein the length adjustment facility is positioned at an intermediate position on the flexible strap away from the second strap end.

6. The support facility for a binocular of claim 1 wherein the second strap end is connected to the tensioner, such that the flexible strap does not protrude beyond the tensioner.

7. The support facility for a binocular of claim 1 wherein the tensioner includes a strap support bar, and the second strap end includes a loop encompassing the strap support bar.

8. The support facility for a binocular of claim 1 wherein the length adjustment facility is configured to provide a continuous range of length adjustment positions.

9. The support facility for a binocular of claim 1 wherein the length adjustment facility is infinitely adjustable within the range of length adjustment positions.

10. The support facility for a binocular of claim 1 wherein the flexible strap is a woven web.

11. The support facility for a binocular of claim 1 wherein the tensioner includes a lever pivotally connected to the base, and the second strap end is connected to the lever.

12. A support facility for a binocular having a pair of connected barrels, the support facility comprising:

a base;

the base including a tripod connection facility;

a flexible strap having a first strap end connected to the base, and an opposed second strap end connected to the base to define an opening configured to receive a first barrel of the binocular;

an adjustor connected to the flexible strap to adjust an effective length of the flexible strap;

the adjustor being infinitely adjustable to securely accommodate a range of barrel diameters;

the base having a free end with opposed sidewalls defining a protected space;

a layer movable between a released position to enable removal of the binocular, and a secured position immobilizing the binocular, and the lever being received in the protected space when in the secured position.

13. The support facility for a binocular of claim 12 wherein the adjustor includes a tri-bar glide.

14. The support facility for a binocular of claim 12 including a tensioning facility movable between a secured and released condition.

15. The support facility for a binocular of claim 14 wherein the second strap end is connected to the tensioning facility, such that the flexible strap does not protrude beyond the tensioning facility.

16. The support facility for a binocular of claim 14 wherein the tensioning facility includes a strap support bar, and the second strap end includes a loop receiving the strap support bar.

17. The support facility for a binocular of claim 12 wherein the adjustor is configured to provide a continuous range of length positions.

18. The support facility for a binocular of claim 12 wherein the flexible strap is a woven web.

* * * * *